Oct. 14, 1941.  W. R. LUSTIG  2,258,781
LID SUPPORT
Filed June 18, 1937  2 Sheets-Sheet 1
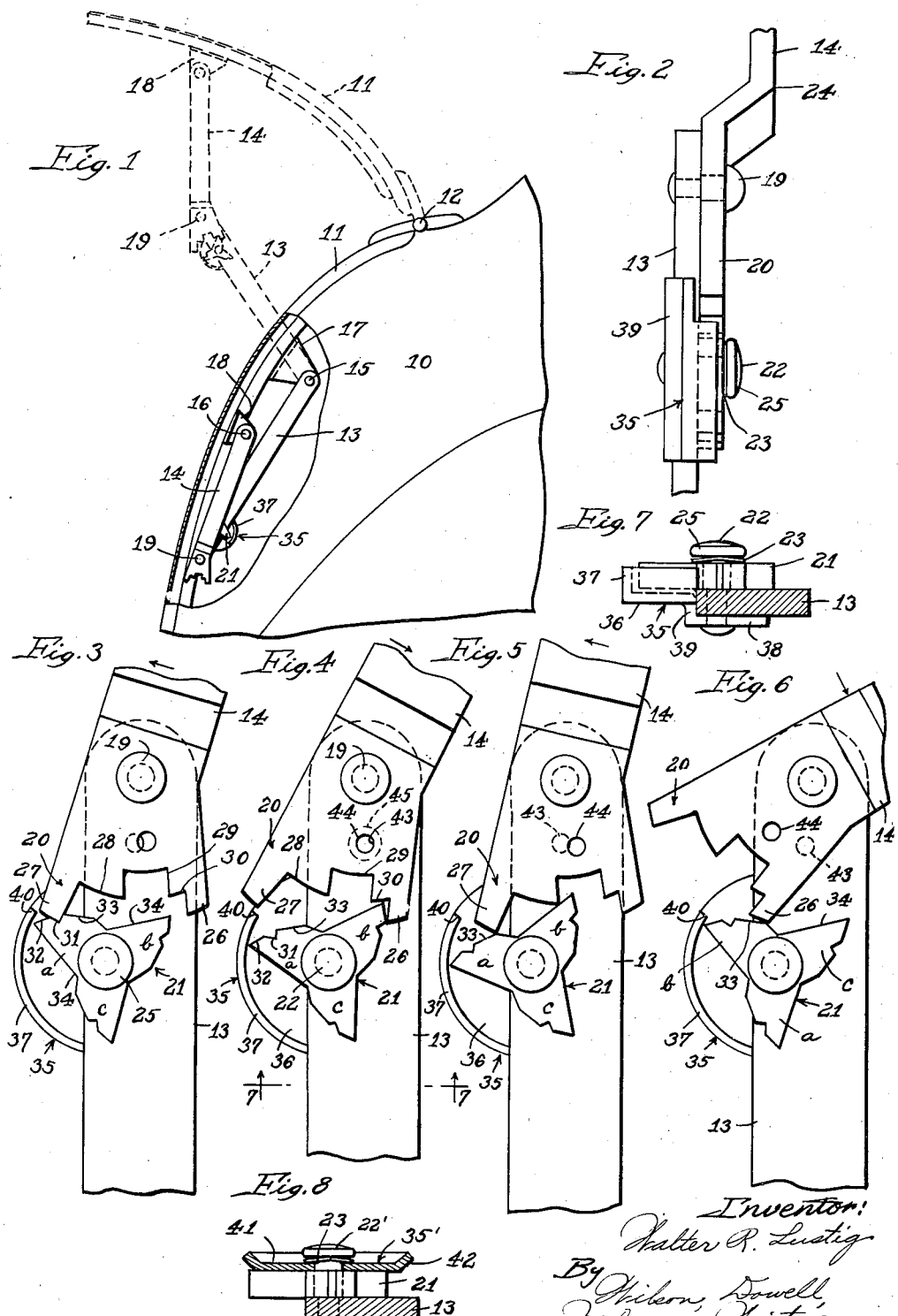

Oct. 14, 1941.                W. R. LUSTIG                2,258,781
                                LID SUPPORT
                          Filed June 18, 1937            2 Sheets-Sheet 2
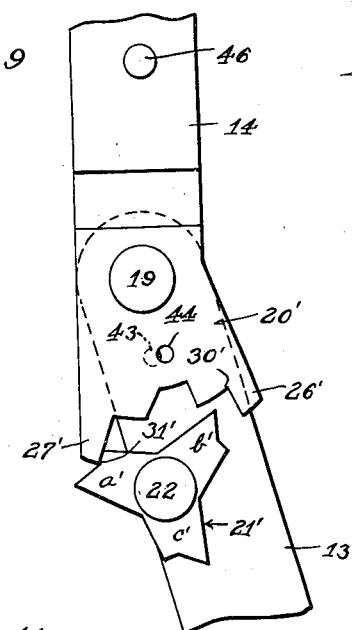
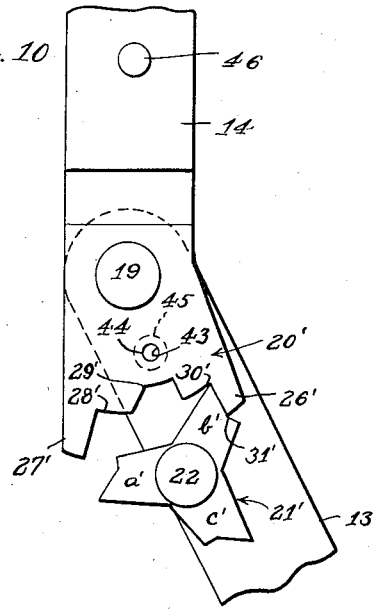
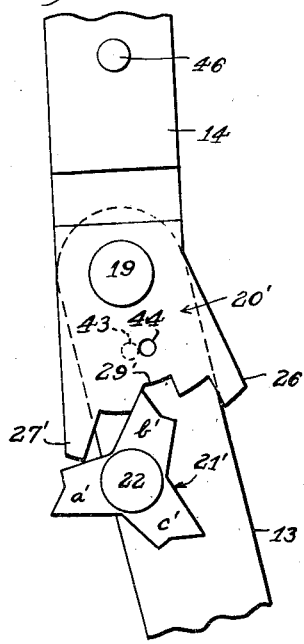
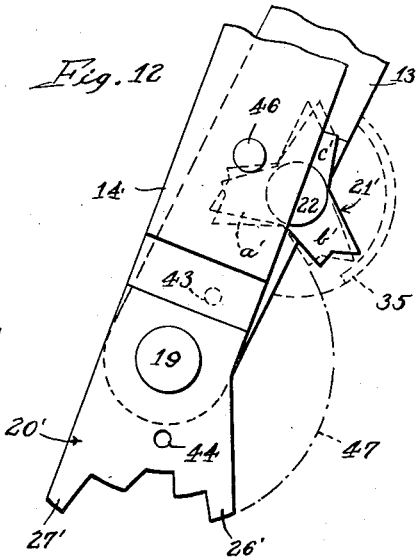
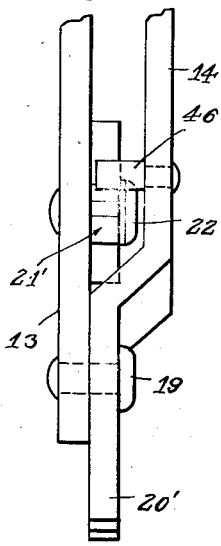
Inventor:
Walter R. Lustig
By
Wilson, Dowell, McCanna & Wintersenn
Attys.

Patented Oct. 14, 1941

2,258,781

UNITED STATES PATENT OFFICE 2,258,781

LID SUPPORT

Walter R. Lustig, Rockford, Ill.

Application June 18, 1937, Serial No. 148,829

13 Claims. (Cl. 217—60)

This invention relates generally to supports for liftable hinged closures, and is more particularly concerned with a support for the lid of a luggage compartment on an automobile or other vehicle.

I am aware that various folding and telescoping types of lid supports have been proposed, but there has invariably been certain drawbacks to their construction either from the standpoint of not getting positive operation or the difficulty of producing the supports in quantity production so that they would perform uniformly and satisfactorily. Some supoprts, for example, proved unsatisfactory because they depended upon a part sliding or turning with a certain frictional resistance, and would accordingly fail to operate correctly with lesser or greater friction. It is therefore the principal object of my invention to provide a support having two pivotally connected arms pivotally attached to the body and lid at their remote ends and equipped with a novel form of positive action pawl and ratchet means for automatically locking the arms in supporting relation.

Some earlier types of supports proved objectionable because the supporting arms would not always interlock in the way intended in response to certain movements of the lid, and it would require several movements of the lid to get the arms in supporting position. An important feature of the present support is the novel indexing pawl on one part which cooperates with the ratchet provided on the other part for positively locking the parts in lid-supporting position on the first operation.

Still another feature of the present support is the provision of guard means or stop means, or both, in connection with the indexing pawl to prevent the same from being accidentally shifted out of operating position by coming in contact with objects in the luggage compartment.

The invention is illustrated in the accompanying drawings, in which—

Figure 1 is a side view of the rear portion of an automobile showing a support made in accordance with my invention, the support being shown folded in full lines with the lid closed and being shown extended in dotted lines with the lid opened;

Fig. 2 is a rear view of the interlocked ends of the arms in supporting relation, as in Fig. 4;

Figs. 3 to 6 are side views of the interlocking ends of the arms, showing the different positions of the parts in one cycle of operation;

Fig. 7 is a sectional detail on the line 7—7 of Fig. 4, showing the guard for the indexing pawl in end elevation;

Fig. 8 is a similar section showing another form of guard;

Fig. 9 is a view similar to Fig. 3, but showing a different shaped pawl and a slightly different shaped ratchet cooperating therewith;

Figs. 10 and 11 are views similar to Figs. 4 and 5, respectively, showing the parts in two other moved positions;

Fig. 12 is a view corresponding somewhat to Fig. 6, but showing the parts in folded position instead of at the beginning of the folded movement, and Fig. 13 is a rear view of Fig. 12.

Similar reference numerals are applied to corresponding parts throughout the views.

Referring first mainly to Fig. 1, the reference numeral 10 designates the luggage compartment of an automobile, and 11 its lid or door hinged, as indicated at 12, to permit raising and lowering the lid to and from the open position illustrated in dotted lines. The support of the present invention comprises two supoprting arms or links 13 and 14 pivotally attached at 15 and 16, respectively, to the side wall of the luggage compartment 10 and edge portion of the lid 11, as shown. Brackets 17 and 18 are riveted or otherwise suitably secured to the body and lid to provide the pivot supports. A rivet pivotally connects the free ends of the arms 13 and 14, as indicated at 19. A ratchet 20 is formed on the end of the arm 14 to cooperate with a three-toothed or star-shaped pawl 21 rotatably mounted on the arm 13 near the outer end thereof on a stud 22. A spring washer 23 under the head of the stud 22 keeps the pawl under spring pressure toward snug frictional engagement with the arm 13, thereby imposing sufficient drag upon the rotation of the pawl to insure its staying in one position until forcibly moved to another. The ratchet end of the arm 14 is bent into offset parallel relation to the rest of the arm, as indicated at 24 in Fig. 2, whereby to provide clearance for the head 25 of stud and permit the arms to fold next to one another, as illustrated in full lines in Fig. 1.

The ratchet 20 and pawl 21, in accordance with the present invention, are so constructed with relation to one another that the pawl catches on the ratchet and thereby locks the arms on each alternate oscillation of the arm 14 relative to the arm 13, the arm 14 being free in between these operations to fold or jack-knife with the arm 13. This is clearly illustrated in Figs. 3 to 6. The ratchet 20 comprises two laterally spaced teeth 26 and 27, the former of which is slightly shorter than the latter, both, however, having their peripheries struck on arcs with the pivot 19 as a center. The end of the arm between the teeth is also struck on an arc, as at 28, with the pivot 19 as a center, and a clearance or reset notch 29 is made in the end of the arm in spaced relation to the tooth 26 so as to leave a stop shoulder 30 next to the tooth. Each tooth of the pawl 21 is generally triangular in form, but has a stop shoulder 31 provided in one side thereof between two angularly related surfaces 32 and 33 forming that side of the tooth. The other side 34 of each tooth is straight.

In operation, when the lid 11 is being closed and the arms 13 and 14 are about to fold, the pawl 21 is left in the position shown in Fig. 6, which view shows the shorter tooth 26 just clearing the end of the surface 33 on the tooth b and moving in a clockwise direction as the arms fold. When the lid 11 is raised, the arms 13 and 14 unfold and move toward coextensive relation. The tooth 26 moves toward the pawl 21 in a counter-clockwise direction and strikes the straight side 34 of the tooth b, thereby slightly shifting the pawl in a clockwise direction and insuring the engagement of the end of the longer tooth 27 with an intermediate point of the surface 32 on tooth a in the further counter-clockwise movement of the arm 14 about its pivot 19. The raising of the lid is limited positively when the tooth 27 rides onto stop shoulder 31, as shown in Fig. 3. The operator through experience in the manipulation of the lid makes it a practice always to raise the lid as far as it will go, knowing that by so doing the lid support, which depends upon such operation, will operate properly. Having raised the lid as far as it will go, the operator then lets go of it, or lowers it, and, after a slight downward movement of the lid sufficient to move the arm 14 through the small angularity from the position of Fig. 3 to that of Fig. 4, the end of tooth b on the pawl 21 strikes the side of tooth 26 on the ratchet 20 and is moved into engagement with the stop shoulder 30. This positively limits the clockwise movement of the arm 14 about its pivot 19 so that the arms 13 and 14 are locked rigidly in lid supporting relation, it being obvious that the pawl 21 under these conditions cannot turn unless the arm 14 is moved in a counter-clockwise direction. The lid is securely supported, there being no "hair trigger" action as in the old style of over-center type supports. As a matter of fact, the pawl will remain in the lid supporting position of Fig. 4 even if the lid happens to be raised a trifle accidentally, either by being brushed against or due to jostling of the car, or due to wind pressure against the lid. Hence, there is no danger of the lid accidentally dropping and causing injury to anyone. The only way the lid can be closed is by raising it as far as it will go and then letting it drop or lowering it. In that operation, the arm 14 is first moved from the position of Fig. 4 to that of Fig. 5 in the raising of the lid, and then from the position of Fig. 5 through that of Fig. 6 to folded position, as the lid is lowered or allowed to drop to closed position. It is clear in Fig. 5 that the tooth 27 in the movement of the arm 14 from the position of Fig. 4 to the position of Fig. 5 has struck the surface 33 on tooth a and turned the pawl 21 in a counter-clockwise direction to the position shown in Fig. 5, thereby bringing the end of tooth b of the pawl 21 into the reset notch 29, so that, in the subsequent folding of the arms, the tooth 26 striking the shouldered side of the tooth b will turn the pawl 21 in a counter-clockwise direction through about 90° to the position of Fig. 6, ready for the next cycle. The spring washer 23 holds the pawl 21 in this indexed position securely enough so that there is no danger of the pawl not cooperating with the ratchet 20 properly the next time the lid is raised.

A sheet metal guard 35 is shown in Figs. 1 to 7, comprising a nearly semi-circular portion 36 in a plane parallel with one side of the pawl 21 and having an arcuate flange 37 struck on an arc with the pivot 22 as a center and on a radius slightly greater than the distance to the apex of any one of the substantially triangular teeth of the pawl. The guard 35 has an integral attaching lug 38 formed with a right angle bend 39 connecting it with one side of the portion 36, as clearly appears in Fig. 7, so that the guard is arranged to fit neatly against the edge of the arm 13 and be fastened by the same stud 22 which forms the pivot for the pawl 21. The flange 37 terminates at 40 to provide working clearance for the tooth 27, and hence there is room enough for the tooth 26 likewise to pass by the flange in the folding and unfolding of the arms, as should be clear in Figs. 3 to 6. It is clear from Fig. 1 that the guard 35 extends out from the arm 13 into the luggage compartment 10 and its flange 37 prevents the pawl from accidentally coming in contact with anything in the luggage compartment. Bearing in mind the fact that the pawl is furthermore held in adjusted position by the spring washer 23, it follows therefore that the pawl, being guarded against accidental engagement with anything in the luggage compartment, will be in the proper position to cooperate with the ratchet 20 properly when the lid is raised.

A different form of guard 35' is shown in Fig. 8. This consists of a circular disk 41 through the center of which the stud 22' extends, whereby to hold the guard disk in concentric relation with the pawl 21 and also under spring tension of the washer 23, which it will be noticed is disposed under the head of the stud, bearing against the disk 41. The disk is of approximately the same diameter as the pawl, and has an annular flange 42 defining the periphery thereof and bent at an acute angle to the plane of the disk and reaching to a radius slightly larger than the radius of the pawl. The flange 42 keeps the pawl 21 from coming in contact with objects in the luggage compartment, but at the same time does not interfere in any way with the ratchet 20 engaging the pawl.

The pawl 21' illustrated in Figs. 9 to 13 cooperates with a ratchet 20' in a closely similar manner to the functioning of the ratchet 20 and pawl 21, above described. Corresponding portions of the pawl and ratchet have been numbered to correspond with the pawl and ratchet shown in Figs. 1 to 7, but using prime numbers, and it is believed that the operation of this pawl and ratchet mechanism should be clear from the description of the other mechanism.

In Figs. 3 to 6 and 9 to 11, it will be noticed that holes 43 and 44 are provided in the arms 13 and 14, respectively, which are located on the same radius with respect to the pivot 19 and come into register when the arms are interlocked in lid supporting relation, as shown in Fig. 4. One may enter a nail or cotter-pin through these registering holes, as indicated by the nail head in dotted lines at 45 in Figs. 4 and 10, whereby to positively lock the arms against movement from lid supporting position. Now, while this is merely a precautionary provision intended mainly as a safety feature for protection of the workmen on the car assembly line, who make it a practice to leave the lid raised after the lid support has been assembled on the car, thus giving rise to the danger of injury to other workmen if the car happens to be jostled sufficiently to cause the lid to drop, it may be used by the motorist also, although there is ordinarily no need for the observance of such a degree of caution in the regular use of this lid support.

The guards 35 and 35' are rendered unnecessary, in so far as protection of the pawl against accidental movement is concerned, when a stop pin 46 is provided on the ratchet-carrying arm 14 arranged to engage the pawl on the other arm 13 in the folding of the support, because, as shown in Figs. 12 and 13, this pin holds the pawl against turning, or at least limits its turning between such narrow limits that the pawl cannot get into a position where it will not cooperate with the ratchet when the arms are unfolded the next time the lid is raised. Of course, as indicated in dotted lines in Fig. 12, a guard 35, or for that matter a guard similar to the one shown in Fig. 8 at 35', may be provided in connection with the pawl in addition, but only for the sake of providing a rounded fixed projection to prevent the sharp tooth of the pawl from coming into contact with objects in the luggage compartment, it being obvious that the rounded projection 35 or 35', as the case may be, would ride easily over an object without damaging the same, whereas the sharp tooth of the pawl when the pawl is held against turning by the pin 46 might do damage by scratching or cutting the object, or actually penetrating it. The pin 46, when it contacts the adjacent tooth of the pawl in the folding of the support, jogs the pawl to a small angularity from the dotted line position shown in Fig. 12 to the full line position, whereby to provide additional clearance between the tooth 26' of the ratchet 26' and the tooth of the pawl 21' when the support is unfolded the next time the lid is raised, and accordingly avoid any remote likelihood of a jam occurring by reason of the tooth 26' of the ratchet failing to have operating clearance with respect to the tooth of the pawl which it first encounters in the unfolding of the support. This point is clearly illustrated in Fig. 12 by the dot and dash arc 47 extending from the tooth 26' to the tooth b' of the pawl, that being the tooth which in the folding of the support on the last operation rode over the end of the tooth 26' and turned the pawl from the position of Fig. 11 to that of Fig. 12. The pin 46 therefore not only locks the pawl so that it cannot be accidentally shifted by contact with objects in the luggage compartment to a position where it might not cooperate properly with the ratchet, but it also purposely shifts or jogs the pawl through a small angularity in the folding of the support so that the pawl will be certain of co-operating properly with the ratchet when the lid is raised the next time and the support unfolds with it.

The present lid support has quite an advantage over other lid supports constructed with pin and slot connections between the arms, because those supports are quite apt to develop rattles unless good precautions are taken to see to it that the arms are maintained under tension in their folded position. Furthermore, those types invariably require a limiting stop in connection with one of the arms to determine the position of the folded support in the luggage compartment. The present support in contrast to these others can fold to only one position in the luggage compartment, because the arms have a simple pivotal connection at 10 as distinguished from a pin and slot connection, and hence there is no need for any limiting stop. The simple pivotal connection at 19 also eliminates any danger of rattling, even without special precautions taken in that regard. As a matter of fact, the pivots at 15, 16, and 19 are plain riveted connections with the rivets made purposely quite tight so as to avoid rattling. This is made possible with the present invention because the support does not rely upon one arm swinging freely while the other has frictional drag, as in certain other types of supports which rely on the effect of gravity for successful operation. The present support, in other words, is positive in its operation and foolproof and is furthermore simpler and more economical in construction than most other supports with which I am familiar.

It is believed the foregoing description conveys a good understanding of the objects and advantages of my invention. The appended claims have been drawn with a view to covering all legitimate modifications and adaptations.

I claim:

1. In a lid support comprising an arm pivotally attached to a lid, and another arm pivotally attached to a receptacle on which the lid is hinged, said arms being pivotally connected at their free ends, pawl and ratchet means for releasably locking said arms in unfolded relation supporting the lid in raised position, comprising a ratchet and a plural toothed rotary pawl one of which is movable relative to the other with one of said arms so that the pawl and ratchet move into and out of mesh and the pawl turns progressively in one direction to and from locking position relative to the ratchet, said ratchet having two abutments spaced in the direction of oscillatory movement of the arms, said abutments being so spaced and proportioned in relation to the shape and spacing of the pawl teeth to provide an extension limit stop and retracting limit stop in alternate lid lifting and lowering movements, the pawl having at least three radial teeth in equally circumferentially spaced relation, each generally triangular in form, straight on one side and having an outwardly facing shoulder on the other side, the ratchet having a reset notch between the two abutments to allow entry of the end of a tooth of the pawl in the indexing rotation of the pawl while meshed with the ratchet.

2. A lid support comprising an arm pivotally attached to a lid, another arm pivotally attached to a receptacle on which the lid is hinged, said arms being pivotally connected at their free ends, and a ratchet rigid with the free end of one of said arms oscillatable relative to a plural toothed pawl rotatably mounted on the free end of the other arm, each of the teeth of said pawl having a shoulder on one side thereof for engagement by a tooth of said ratchet to limit relative oscillatory movement between the ratchet and pawl in one direction, and said pawl teeth being so spaced and proportioned relative to the teeth of said ratchet for engagement of the next tooth of the pawl with another tooth of the ratchet to limit relative oscillatory movement between the ratchet and pawl in the opposite direction.

3. A lid support comprising an arm pivotally attached to a lid, another arm pivotally attached to a receptacle on which the lid is hinged, said arms being pivotally connected at their free ends, and a ratchet rigid with the free end of one of said arms oscillatable relative to a plural toothed pawl rotatably mounted on the free end of the other arm, each of the teeth of said pawl having a shoulder on one side thereof for engagement by a tooth of said ratchet to limit relative oscillatory movement between the ratchet and pawl in one direction, and said pawl teeth being so spaced and proportioned relative to the teeth of said ratchet for engagement of the next tooth of the pawl with another tooth of the ratchet to limit relative oscillatory movement between the ratchet and pawl in the opposite direction, the ratchet being cut out between the teeth thereof to provide clearance for the teeth of the pawl in the indexing of the latter by the ratchet.

4. A lid support comprising an arm pivotally attached to a lid, another arm pivotally attached to a receptacle on which the lid is hinged, said arms being pivotally connected at their free ends, and a two-toothed ratchet rigid with the free end of one of said arms oscillatable relative to a pawl rotatably mounted on the free end of the other arm, the pawl having at least three radial teeth in equally circumferentially spaced relation, one of the ratchet teeth being longer than the other, and the teeth of the pawl being of uniform size and shape, each having a shoulder on one side thereof for engagement by the longer tooth of the ratchet to limit relative oscillatory movement between the ratchet and pawl in one direction, and said pawl teeth and ratchet teeth being so spaced and proportioned relative to one another for engagement of the next tooth of the pawl with the shorter tooth of the ratchet to limit relative oscillatory movement between the ratchet and pawl in the opposite direction.

5. A lid support comprising an arm pivotally attached to a lid, another arm pivotally attached to a receptacle on which the lid is hinged, said arms being pivotally connected at their free ends, and a two-toothed ratchet rigid with the free end of one of said arms oscillatable relative to a pawl rotatably mounted on the free end of the other arm, the pawl having at least three radial teeth in equally circumferentially spaced relation, one of the ratchet teeth being longer than the other, and the teeth of the pawl being of uniform size and shape, each having a shoulder on one side thereof for engagement by the longer tooth of the ratchet to limit relative oscillatory movement between the ratchet and pawl in one direction, and said pawl teeth and ratchet teeth being so spaced and proportioned relative to one another for engagement of the next tooth of the pawl with the shorter tooth of the ratchet to limit relative oscillatory movement between the ratchet and pawl in the opposite direction, the ratchet being cut out between the teeth thereof to provide clearance for the teeth of the pawl in the indexing of the latter by the ratchet.

6. A lid support comprising an arm pivotally attached to a lid, another arm pivotally attached to a receptacle on which the lid is hinged, said arms being pivotally connected at their free ends, and a ratchet rigid with the free end of one of said arms oscillatable relative to a plural toothed pawl rotatably mounted on the free end of the other arm, each of the teeth of the pawl being substantially triangular in form with the apex outermost relative to the center of revolution of the pawl and with one side substantially straight and the other side having a shoulder for engagement by a tooth of said ratchet to limit relative oscillatory movement between the ratchet and pawl in one direction, and said pawl teeth being so spaced and proportioned relative to the teeth of said ratchet for engagement of the next tooth of the pawl with another tooth of the ratchet to limit relative oscillatory movement between the ratchet and pawl in the opposite direction.

7. A lid support comprising an arm pivotally attached to a lid, another arm pivotally attached to a receptacle on which the lid is hinged, said arms being pivotally connected at their free ends, and a ratchet rigid with the free end of one of said arms oscillatable relative to a plural toothed pawl rotatably mounted on the free end of the other arm, each of the teeth of the pawl being substantially triangular in form with the apex outermost relative to the center of revolution of the pawl and with one side substantially straight and the other side having a shoulder for engagement by a tooth of said ratchet to limit relative oscillatory movement between the ratchet and pawl in one direction, and said pawl teeth being so spaced and proportioned relative to the teeth of said ratchet for engagement of the next tooth of the pawl with another tooth of the ratchet to limit relative oscillatory movement between the ratchet and pawl in the opposite direction, the ratchet being cut out between the teeth thereof to provide clearance for the teeth of the pawl in the indexing of the latter by the ratchet.

8. A lid support comprising an arm pivotally attached to a lid, another arm pivotally attached to a receptacle on which the lid is hinged, said arms being pivotally connected at their free ends, and a two-toothed ratchet rigid with the free end of one of said arms oscillatable relative to a pawl rotatably mounted on the free end of the other arm, the pawl having at least three radial teeth in equally circumferentially spaced relation, one of the ratchet teeth being longer than the other, and the teeth of the pawl being substantially triangular in form with the apex outermost relative to the center of revolution of the pawl and with one side substantially straight and the other side having a shoulder for engagement by the longer tooth of the ratchet to limit relative oscillatory movement between the ratchet and pawl in one direction, and said pawl teeth and ratchet teeth being so spaced and proportioned relative to one another for engagement of the next tooth of the pawl with the shorter tooth of the ratchet to limit relative oscillatory movement between the ratchet and pawl in the opposite direction.

9. A lid support comprising an arm pivotally attached to a lid, another arm pivotally attached to a receptacle on which the lid is hinged, said arms being pivotally connected at their free ends, and a two-toothed ratchet rigid with the free end of one of said arms oscillatable relative to a pawl rotatably mounted on the free end of the other arm, the pawl having at least three radial teeth in equally circumferentially spaced relation, one of the ratchet teeth being longer than the other, and the teeth of the pawl being substantially triangular in form with the apex outermost relative to the center of revolution of the pawl and with one side substantially straight and the other side having a shoulder for engagement by the longer tooth of the ratchet to limit relative oscillatory movement between the ratchet and pawl in one direction, and said pawl teeth and ratchet teeth being so spaced and proportioned relative to one another for engagement of the next tooth of the pawl with the shorter tooth of the ratchet to limit relative oscillatory movement between the ratchet and pawl in the opposite direction, the ratchet being cut out between the teeth thereof to provide clearance for the teeth of the pawl in the indexing of the latter by the ratchet.

10. An escapement mechanism for detachably interlocking two members, one of which is movable back and forth relative to the other so that the pawl and ratchet of the mechanism go into and out of engagement in each cycle of operation, said mechanism comprising a pawl adapted to be rotatably supported on one of said members and having at least three teeth in substantially equally circumferentially spaced relation, and a ratchet adapted to be supported on the other of said members and having two abutments spaced in the direction of relative movement between said members, both of said abutments arranged to engage whichever two adjacent teeth of the pawl are in operative relation to the ratchet, means comprising a stop shoulder on one side of the first of said two pawl teeth engageable by the first of said ratchet abutments to limit relative movement between said members in one direction, means comprising a stop shoulder on the ratchet next to the second abutment engageable by the second of said two pawl teeth to limit relative movement in the opposite direction, means comprising a surface on the side of the second ratchet abutment adjacent the stop shoulder slidably engageable by the second pawl tooth, and surfaces on the first pawl tooth on opposite sides of the stop shoulder slidably engageable in sequence by the first ratchet abutment in repeated back and forth movements of said members to cause intermittent indexing rotation of the pawl progressively in one direction, and means comprising a reset notch in the ratchet alongside the stop shoulder and arranged to receive and slidably engage the end of the second pawl tooth to index the pawl to a starting position for the next cycle of operation.

11. An escapement mechanism for detachably interlocking two members, one of which is movable back and forth relative to the other so that the pawl and ratchet of the mechanism go into and out of engagement in each cycle of operation, said mechanism comprising a pawl adapted to be pivotally supported on one of said members and having at least two teeth which project in opposite directions relative to the pivot, and a ratchet adapted to be supported on the other of said members and having two abutments spaced in the direction of relative movement between said members, said abutments being arranged on opposite sides of the two teeth of the pawl when the latter is in operative relation to the ratchet, means comprising a stop shoulder on one side of the first of the pawl teeth engageable by the first of the ratchet abutments to limit relative movement between said members in one direction, means comprising a stop shoulder on the ratchet next to the second abutment engageable by the second of said two pawl teeth to limit relative movement in the opposite direction, and means comprising a surface on the side of the second ratchet abutment adjacent the stop shoulder slidably engageable by the second pawl tooth, and surfaces on the first pawl tooth on opposite sides of the stop shoulder slidably engageable in sequence by the first ratchet abutment in repeated back and forth movements of said members to cause the pawl to be indexed to a position where the two members are freely movable relative to one another in the same direction in which the pawl previously limited relative movement by engagement with the stop shoulder on the ratchet.

12. An escapement mechanism for detachably interlocking two members adapted to have back and forth movement relative to one another so that the pawl and ratchet means of the mechanism go into and out of engagement in the relative movement of the two members in each cycle of operation, said mechanism comprising a pawl adapted to be pivotally supported on one of said members and having at least two teeth which project in opposite directions relative to the pivot, and ratchet means adapted to be supported on the other of said members comprising two pawl engaging abutments spaced in the direction of relative movement between said members so as to be disposed on opposite sides of the pawl when in operative relation thereto, and a cutaway portion therebetween, means comprising positively interengageable shoulders on the first of the pawl teeth and pawl engaging abutments to limit relative movement between said members in one direction, means comprising positively interengageable shoulders on the second of the pawl teeth and pawl engaging abutments to limit relative movement between said members in the opposite direction, means comprising slidably interengageable surfaces on the first pawl tooth and cooperating first abutment and slidably interengageable surfaces on the second pawl tooth and cooperating second abutment, for indexing the pawl from a starting position to the second position limiting movement between the members in one direction and for indexing the pawl from the second position to the third position limiting movement between the members in the opposite direction, other means comprising other slidably interengageable surfaces on the first pawl tooth and first abutment for indexing the pawl to a fourth position with the second tooth thereof striking one side of the cutaway portion to limit relative movement between the members in the first direction, and other means comprising other slidably interengageable surfaces on the second tooth and other side of the cutaway portion and second abutment for indexing the pawl back to the starting position in which the two members are freely movable relative to one another in the same direction in which the pawl previously limited relative movement by engagement of the second tooth thereof with the second abutment.

13. An escapement mechanism for detachably interlocking two members, one of which is movable back and forth relative to the other so that the pawl and ratchet of the mechanism go into and out of engagement in each cycle of operation, said mechanism comprising a pawl adapted to be rotatably supported on one of said members and having at least three teeth in substantially equally circumferentially spaced relation, and a ratchet adapted to be supported on the other of said members and having two abutments spaced in the direction of relative movement between said members, both of said abutments arranged to engage whichever two adjacent teeth of the pawl are in operative relation to the ratchet, means comprising a stop shoulder on one side of the first of said two pawl teeth engageable by the first of said ratchet abutments to limit relative movement between said members in one direction, means comprising a stop shoulder on the ratchet next to the second abutment engageable by the second of said two pawl teeth to limit relative movement in the opposite direction, means comprising a surface on the side of the second ratchet abutment adjacent the stop shoulder slidably engageable by the second pawl tooth, and surfaces on the first pawl tooth on opposite sides of the stop shoulder slidably engageable in sequence by the first ratchet abutment in repeated back and forth movements of said members to cause the pawl to be indexed to a position where the two members are freely movable relative to one another in the same direction in which the pawl previously limited relative movement by engagement with the stop shoulder on the ratchet.

WALTER R. LUSTIG.